Figure 1:
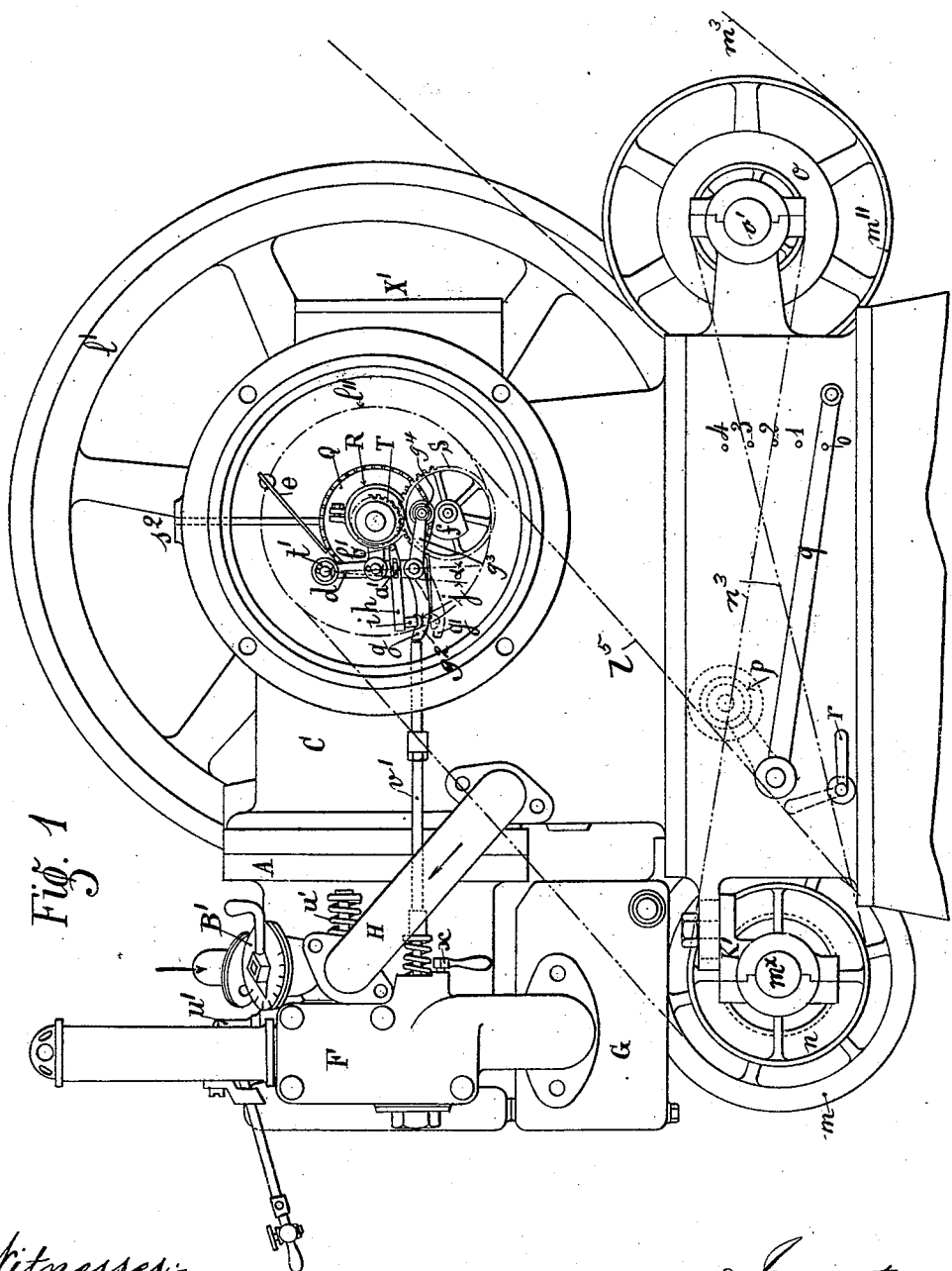

(No Model.) 3 Sheets—Sheet 1.

H. M. L. CROUAN.
GAS OR PETROLEUM MOTOR.

No. 515,116. Patented Feb. 20, 1894.

Witnesses:
H. K. Boulter
[signature]

Inventor:
Henry M. L. Crouan
by his attorney
Wm. E. Boulter (No Model.) 3 Sheets—Sheet 2.

H. M. L. CROUAN.
GAS OR PETROLEUM MOTOR.

No. 515,116. Patented Feb. 20, 1894.

Witnesses:
H. K. Boulter
J. L. Northup

Inventor:
Henry M. L. Crouan
by his attorney Wm. E. Boulter (No Model.) 3 Sheets—Sheet 3.
H. M. L. CROUAN.
GAS OR PETROLEUM MOTOR.
No. 515,116. Patented Feb. 20, 1894.
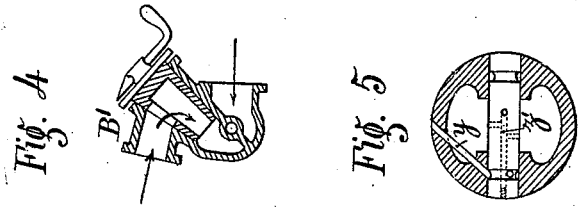
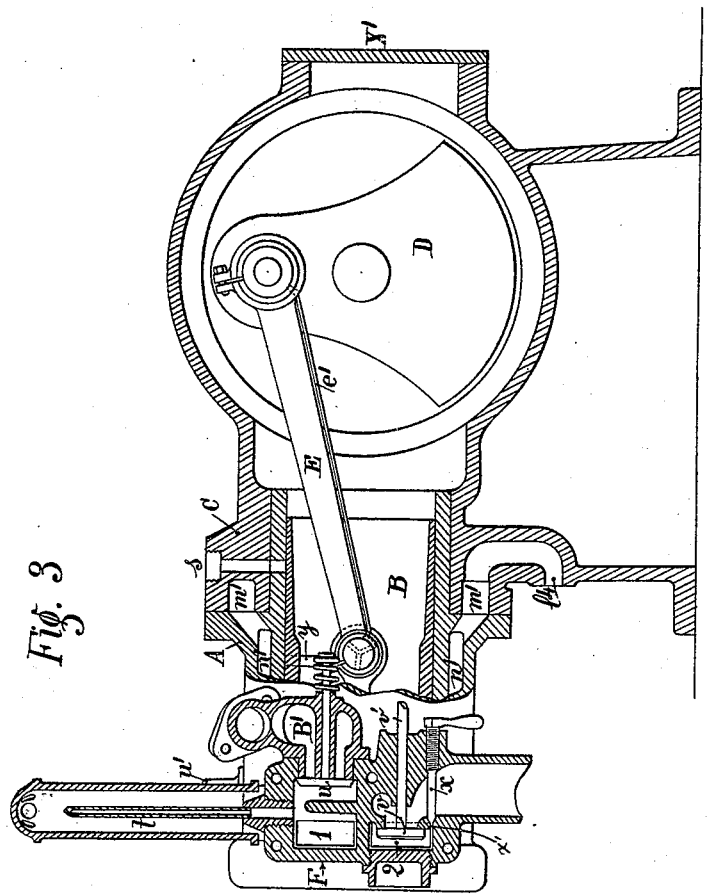
Witnesses:
H. K. Boulter
O. T. Northrup
Inventor:
Henry M. L. Crouan,
by his attorney
Wm. O. Boulter.
THE NATIONAL LITHOGRAPHING COMPANY,
WASHINGTON, D. C.

UNITED STATES PATENT OFFICE.

HENRY MARIE LÉON CROUAN, OF PARIS, FRANCE.

GAS OR PETROLEUM MOTOR.

SPECIFICATION forming part of Letters Patent No. 515,116, dated February 20, 1894.

Application filed April 25, 1893. Serial No. 471,772. (No model.)

*To all whom it may concern:*

Be it known that I, HENRY MARIE LÉON CROUAN, a citizen of the French Republic, residing at Paris, France, have invented certain new and useful Improvements in Gas or Petroleum Motors, of which the following is a full, clear, and exact description.

My invention has relation to gas or petroleum engines, and it has for its primary object to provide a comparatively simple, and inexpensive engine adapted to be operated by an explosive fluid, and which is efficient and economical in operation, and giving the greatest amount of working force for a given amount of fuel consumed, and with the above and other objects in view, the invention consists in the novel construction, arrangement and combination of parts as hereinafter described, illustrated in the drawings and pointed out in the appended claims.

Figure 2:
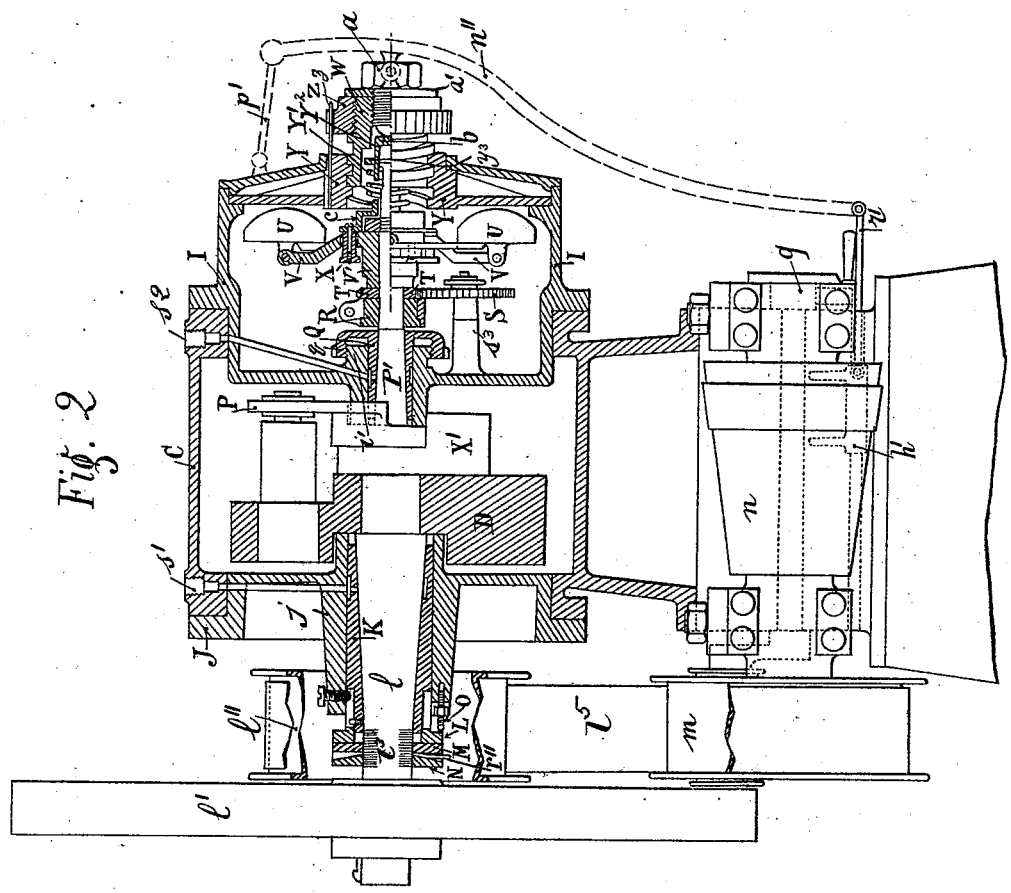

In the drawings:—Figure 1 is a side elevation of my improved engine, parts being omitted. Fig. 2 is a transverse sectional view taken through the center of the driving shaft. Fig. 3 is a central vertical section of Fig. 1. Fig. 4 is an enlarged detail sectional view of the admission valve. Fig. 5 is an enlarged detail sectional view of one of the journal pins of the piston-rod showing the manner of lubricating the same.

Referring to the above described drawings, A indicates a cylinder supported upon a suitable frame or base C which forms a casing in which is arranged a crank plate D which is mounted upon one end of a transversely arranged driving shaft $l$, which at its opposite end is provided with a driving pulley $l''$ and a fly-wheel $l'$. One end of the case C is closed by a head J which has the central hub $j$ in which is mounted a bearing sleeve K having a tapering bore as shown and within which bore is revolubly mounted the driving shaft, that portion thereof which has a bearing in the sleeve being correspondingly tapered. The shaft $l$ at a point just beyond the sleeve K is threaded as at $l^3$ and upon which threaded portion works a nut N and adjacent to this nut is arranged a washer M. Between the latter and the end of the sleeve K is interposed a bearing plate L which has a tapering bore adapted to fit and work over the tapered extremity $k'$ of the sleeve. Thus by screwing the nut inwardly, the sleeve K will be caused to bind closely upon the shaft and compensate for wear of these parts.

The washer M carries a leaf spring $r''$ which is adapted to take into notches or depressions (not shown) provided on the inner face of the nut and thus serve as a lock for the nut to prevent its working loose. A screw O working in the head J may be adjusted to vary the extent of inward movement of the cap L.

The lubrication of the crank shaft may be readily effected by means of the vertically arranged tube $s'$ which passes through the sleeve K and hub of the head J. The other end of the case C is closed by means of a head I which has the shape shown, that is to say, it forms a hollow case adapted to receive the governing devices of the motor as presently described. To the crank pin is pivotally connected an arm P whose opposite end is mounted upon a shaft P' which is conical as shown and has its bearings in a conical bearing sleeve Q and which is provided with the threaded flange $q$, which is adjustably mounted upon the threaded boss $i'$ of head I. Thus by screwing the sleeve in the proper direction the wear between it and the shaft may be compensated for. Lubrication of the shaft P' may be effected through the tube $s^2$ which passes through the head I and sleeve, as shown.

Upon the shaft P' is mounted an eccentric R, the yoke whereof is adapted to oscillate the lever $d$, at each revolution of the shaft P'. Said lever $d$ is pivoted to the case and is provided at its lower end with a pivoted lever $g$ which at certain periods is adapted to bear upon and push forwardly a valve rod $v'$ carrying at its opposite end within the valve case F, a valve $v$.

T indicates a gear wheel mounted on the shaft P' and gearing with a gear wheel S having twice the diameter of gear wheel T, said gear wheel S being mounted upon a bracket arm $s^3$ projecting from the interior of the head I and upon the projecting end of the stud or shaft of the gear wheel S is mounted a cam $f$, which is adapted to bear upon and raise the arm $g^3$ of the lever $g$ and consequently depress the arm $g^2$, at every second revolution of the shaft P'. Said arm $g^3$ carries a roller $g^4$ against which is adapted to bear the cam $f$.

The lever $d$ carries an arm $h$ having at one end a knob or projection $b'$ and at its opposite end a catch or hook $i$. The lever $g$ is provided with a lug or stud $j$ which when the motor is not working at too great a speed is not engaged by the catch $i$, owing to the arm $h$ being held in the position indicated in Fig. 1, but when the speed of the engine becomes greater than the normal one and the regulating devices come into action, the catch $i$ of lever $h$ is adapted to engage the lug $j$ and maintain the lever $g$ in the position indicated by dotted lines $g'$, so that the said lever $g$ will not be in a position to operate upon the valve rod $v'$.

The shaft P' carries a sleeve V' upon which is mounted a ring X having diverging arms V which carry at their outer ends weights U. Said ring X is adapted to bear upon the end $b'$ of the lever $h$, during the normal working of the engine but when the weights spread and move the arms and ring slightly upon sleeve V' the ring X then ceases to act upon the end $b'$ for a purpose before explained. For varying the centrifugal force necessary for the described movement of the ring and arms I employ a cap $c$ secured to ring X and against which is adapted to bear a coiled spring Y'. A cap $Y^2$ mounted loosely on the shaft P' is adapted to be moved in either direction by means of a sleeve W working in a threaded bore of a head Y closing the outer end of head I to vary the tension of said spring and consequently to vary the degree of centrifugal force necessary for the movement of the arms and ring before set forth, said sleeve W being adapted to bear upon the flange $y^3$ of said cap $Y^2$. A nut Z is mounted on the threaded outer end of the sleeve W by means of which nut Z the sleeve may be turned readily. The nut Z may be locked in its adjusted position by means of a spring $z$ adapted to engage notches in the circumferential edge of the nut Z.

The ignition of the gaseous mixture may be effected in any suitable manner and by any desired means, as for instance by an incandescent tube $t$.

B indicates the piston working within the cylinder and to which is pivotally connected one end of the rod E whose opposite end is jointed to the crank plate D.

By more or less uncovering the opening $x'$ by means of a pointed screw $x$ working in the case the degree of compression of the mixture by the piston may be varied.

The lubrication of the piston may be effected through a channel $s$, in the case and cylinder while the lubrication of the journal pins of the piston rod may be effected by a pipe $y$ which is adapted to register with the lower end of the channel $s$ at each forward or working stroke of the piston and by means of a pipe $e'$ which is adapted to receive the excess of oil from the journal pin connecting the rod E to the piston, and deliver said excess to the journal pin connecting the other end of rod E to the crank plate. The pipe $y$ conducts the lubricant to openings $z'$ in the journal pin for the thorough lubrication of the same. The outer end of the case is closed by a cap or plate X'.

The driving pulley $l''$ is belted by a belt $l^5$ to a pulley $m$, mounted on a shaft $m^x$ supported in bearings secured to the engine frame and upon said shaft is also mounted a cone pulley $n$, which is belted by a cross belt $n^3$ to a like pulley $o$ arranged reversely with relation to pulley $n$, and mounted on a shaft $o'$ at the other end of the frame. From the shaft $o'$ the motive power is transmitted to any driven machinery by means of a belt pulley $m''$ and belt $m^3$. A suitable belt shifter $h''$ is employed for moving the belt to different positions on the cone pulleys to thus vary the speed of the shaft $o'$. The shifting of the belt may if it is desired, be effected automatically by means of a rod $r'$ to which is connected the lower end of a rod $n''$ whose upper end is connected to sleeve W by connections $a$ $a'$ and to a rod $p'$ jointed to the head Y which latter is adapted to move outwardly when the speed of the motor increases beyond the normal and thus cause the belt $n^3$ to be shifted. In this way the speed at which the driven part is driven is kept uniform regardless of the variation in the speed of the engine.

In operation, the first forward stroke of the piston draws in a mixture of air and gas from within the hollow frame of the engine, through the valve B' which is in communication with the pipe H. The closing of the communication between the valve B' and cylinder being effected by a valve $u$, which is automatically operated upon by a spring $u'$. The mixture of air and gas enters the cylinder through inlet passage 1. Upon the return stroke of the piston the mixture is compressed and when a sufficient compression has taken place, the ignition of the mixture is effected in any desired manner as before stated. The piston then makes its working stroke and just before the termination of the said stroke the lever $g$ is freed from the cam $f$ and is then operated by the lever $d$ to cause the exhaust valve $v$ to be opened so that upon the next return stroke of the piston the products of combustion are expelled through passage 2, which is in communication with the outer air, and the described operations are repeated during the working of the engine. The cooling of the cylinder may be effected by passing water through the passages $m'$ $n'$ formed in the cylinder and discharging through passage $l^4$ in the frame of the engine.

A suitable tension pulley $p$ may be employed for varying the tension of belt $l^5$ said pulley being carried by an arm $p'$ connected to one end of a rod $q$ whose opposite end may be adjusted to different elevations by a pin $o$ entering different openings 1, 2, 3 and 4 in the engine case.

What I claim is—

1. In a gas or petroleum engine, the combination with the casing and a revoluble crank shaft supported thereby, of a shaft driven from said crank shaft, an eccentric mounted upon the driven shaft, a lever adapted to be oscillated by said eccentric, a second lever carried by the first lever, and provided with a lug or projection, an arm pivotally mounted upon the first lever and adapted to engage the said lug or projection and depress the lever carrying the same, as described, a rod adapted to be periodically moved longitudinally by the said second lever, an exhaust valve carried by the said rod, and a revoluble cam adapted to periodically operate upon said second lever to hold it out of engagement with the movable rod, as and for the purpose specified.

2. In a gas or petroleum engine, the combination with the casing and a revoluble crank shaft supported thereby, of a shaft driven from said crank shaft, a sleeve mounted upon said driven shaft and carrying a ring and arms, weights carried by said arms, a movable head carried by the casing, a coiled spring adapted to act upon the latter and the said head, cone pulleys, gearing between the latter and the crank shaft, a belt shifter for the belt between the cone pulleys, and jointed rods adapted to be actuated by the casing head to actuate the said belt shifter for the purpose specified.

3. In a gas or petroleum engine, the combination with the casing and a revoluble crank shaft supported thereby, of a shaft driven from said crank shaft, a sleeve mounted upon said driven shaft and carrying a ring or collar and arms, weights carried by said arms, a movable head carried by the casing, a sleeve adjustably mounted within the said head, a sliding collar arranged within the sleeve, a coiled spring interposed between the latter collar and the former, cone pulleys belted together, gearing between the said pulleys and the crank shaft, a belt shifter for the belt between the cone pulleys, and jointed rods adapted to be actuated by the casing head to actuate the said belt shifter, as and for the purpose specified.

4. In a gas or petroleum engine, the combination with the casing and a revoluble crank shaft supported thereby, of a governor shaft driven from said crank shaft, and having a tapering portion, a sleeve having a tapering bore within which said shaft is mounted, and having a threaded flange, and a head for the casing having a threaded hub within which the sleeve is mounted and with which the threaded flange of the sleeve is adapted to engage, as and for the purpose specified.

5. In a gas or petroleum engine, the combination with the casing, and a cylinder carried thereby, of a piston mounted in the cylinder, a piston rod jointed to the piston, an oil channel in the joint pin, a crank shaft having a crank to which said piston rod is also jointed, a tube arranged longitudinally of and adjacent to the piston rod and communicating with said oil channel and with the crank pin, as and for the purpose specified.

6. In a gas or petroleum engine, the combination with the casing and a revoluble crank shaft supported thereby, of a shaft driven from said crank shaft, a sleeve mounted upon said driven shaft and carrying a ring or collar and arms, weights carried by said arms, a movable head carried by the casing, a sleeve adjustably mounted within the said head, a nut adjustably mounted upon the sleeve and provided with circumferential notches, a spring carried by the head and adapted to engage said notches, a sliding collar arranged within the sleeve, a coiled spring interposed between the latter collar and the former, cone pulleys belted together, gearing between the said cone pulleys and the crank shaft, a belt shifter for the belt between the pulleys, and jointed rods adapted to be actuated by the casing head to actuate the said belt shifter, as and for the purpose specified.

In testimony that I claim the foregoing I have hereunto set my hand this 28th day of March, 1893.

HENRY MARIE LÉON CROUAN.

Witnesses:
HENRI EMILE COUCHAUD,
DAVID T. S. FULLER.